United States Patent Office 3,592,724
Patented July 13, 1971

3,592,724
CEMENTITIOUS LAMINATE OF SULFONATED POLYMERS
Frank King, Jr., Wilhelm E. Walles, and Fred M. Giachino, Midland, Mich., assignors to The Dow Chemical Company, Midland, Mich.
No Drawing. Filed Apr. 21, 1969, Ser. No. 818,093
Int. Cl. B12l 27/30, 27/32
U.S. Cl. 161—160        12 Claims

ABSTRACT OF THE DISCLOSURE

Laminates of surface sulfonated resinous films and inorganic cementitious materials have good water vapor barrier characteristics and good bond strength. They are useful in the construction industry for making walls, floors, ceilings and plasterboards, having improved water vapor impermeability.

BACKGROUND OF INVENTION

This invention relates to a laminate consisting essentially of surface sulfonated polymeric films and an inorganic cement.

It is known to make cementitious laminates. A common prior art method of applying cementitious coatings to base materials such as concrete, concrete block, or bricks is to apply an asphalt emulsion to the base and then apply a plaster of gypsum cement or Portland cement over the tacky asphalt emulsion. This laminate suffers from the disadvantage that the plaster coat tends to crack with aging of the asphalt film.

It is known from U.S. Pat. 2,760,885 that cementitious laminate can be made if the base material is first coated with an emulsion of a re-emulsifiable polyvinyl acetate and then coated with a cement plaster. This laminate has the disadvantage that it will re-emulsify and disintegrate if moisture penetrates into or condenses onto the coating.

It is further known from U.S. Pat. 2,901,377 that cementitious laminates can be made by coating a base material with two resinous primers before a cementitious plaster is applied. This laminate suffers from the disadvantage that each primer must be applied and dried for several hours before the next coating is applied.

SUMMARY OF INVENTION

The laminates of this invention consist essentially of a surface sulfonated water insoluble resinous film and an inorganic cementitious material adhering to at least one surface of said film. For floor applications, the resinous film can be surface sulfonated on one side only and the cementitious material, i.e., concrete, applied to that one side. The best adhesion is obtained when the film is sulfonated and not neutralized since the cementitious material is highly alkaline and forms a good bond with the acidic sulfonate groups on the polymer surface. However, it is within the scope of this invention to use sulfonated films which have been neutralized with bases such as sodium hydroxide and ammonium hydroxide or exchanged with metal salt solutions such as nickel chloride. Preferably, the cementitious material is a latex modified cement. These laminates are useful in the construction industry where a wall, ceiling, floor or plasterboard is desired that has good water vapor barrier characteristics and at the same time sufficient adhesive strength to be self-supporting or rugged.

DETAILED DESCRIPTION

The present invention is realized by preparing a laminate of a sulfonated resinous film having at least one surface coated with a hydraulic cementitious material. Alternatively, the sulfonated resinous film can be coated on both sides with the cementitious material as in the application of this invention to the wall of a building such as a house or a cold storage vault. In such cases, the wall of the building may be considered the base material as it usually consists of bricks, cement blocks, or poured concrete. The hydraulic cement is plastered on this base material about one-eighth inch thick, and while it is still wet, the sulfonated film is adhered to the plastered wall. It is sometimes desirable, for extra strength, to provide horizontal furring of wood strips in the wall or ceiling before applying another surface to the laminate, because the initial wet strength is not sufficient to support this layer. The laminate is allowed to cure for 24 hours at room temperature. The laminated wall can then be finished with a final coat of gypsum plaster. If it is desired, an insulated wall can be prepared in the following manner. Foamed plastic pieces for thermal insulation such as foamed polystyrene, or foamed polyurethane are coated with hydraulic cement about one-eighth inch thick and pushed into place against the exposed surface of the sulfonated film. Alternatively, the cement can be coated or plastered onto the sulfonated film and the foamed plastic assembled thereto. The insulated wall can be further finished, if desired, by a finish coat of plaster on the foamed plastic.

The preparation of a vapor impermeable floor is similar except that the foamed plastic is eliminated and the cement coating on the top side of the sulfonated film is thicker and in the order of one inch thick.

A further illustration of the invention is a plasterboard one-half an inch thick consisting of gypsum cement laminated between two sheets of polyethylene film surface sulfonated on both sides. This laminate is a good barrier to water vapor and yet is strong due to the good bond between the sulfonated film and the gypsum cement. At the same time, the outer surfaces can be readily decorated with water based paints or oil based paints. If desired, one of the above sulfonated film is replaced with a heavy paper as in normal wallboards or gypsum boards to provide an interior surface which can be joined to other wallboards by conventional means such as tape and gypsum cement.

The sulfonated films that are used in this invention are known in the art or can be readily prepared by known processes. For example, sulfonated polyethylene is shown and described in U.S. Pat. 2,937,066; sulfonated substituted non-aromatic polymers are known from U.S. Pat. 2,832,697. The sulfonated and neutralized or exchanged resin films can be prepared by neutralizing the above sulfonated films with sodium hydroxide or ammonium hydroxide followed by treatment with an aqueous solution or slurry of a metal salt in the manner taught by Niles in U.S. Pat. 3,219,717 or by British Pat. 1,100,712. These patents are incorporated by reference herein.

The nature of the polymer used to make the sulfonated film is not critical as long as it is sulfonatable and water insoluble. Various examples of well known films which meet these requirements are cellulose films, polyamide films, polyimide films, polycarbonate films, polyethylene films, ionomer films, polyacrylate films, polyethylene terephthalate films, polyvinyl aromatic films, vinylchloride-vinylacetate copolymer films, polyvinylfluoride films, rubber hydrochloride films, nitrile rubber films, and vinylidene chloride-vinylchloride copolymer films.

A preferred aspect of this invention is to use sulfonated films made from a substituted or unsubstituted hydrocarbon polymer of olefins such as ethylene, propylene, isobutylene, butene-1; homopolymers of haloolefins such as vinyl chloride, vinyl fluoride, vinylidene chloride; chlorinated polyolefins such as chlorinated polyethylene and chlorinated polypropylene; homopolymers of vinyl esters such as vinyl acetate, vinyl propionate and vinyl butyrate; homopolymers of acrylic acid esters and methacrylic acid esters such as ethyl acrylate, methyl acrylate, propyl acrylate, ethyl methacrylate, methyl methacrylate, propyl methacrylate; homopolymers of acrylonitrile; interpolymers of the monomers set forth above; and blends of the foregoing polymers.

The films are sulfonated to the extent or degree that they contain from about 0.001 to about 50 milligram sulfur trioxide equivalents per square centimeter of treated surface. Any degree of sulfonation greater than this extent is uneconomical and the film is rendered dark brown or black and corroded. A degree of sulfonation less than this amount does not have the requisite adhesion. The methods by which the film is sulfonated are set forth in the above patents and form no part of the present invention.

For the purposes of this invention the terms hydraulic cementitious material are defined as an inorganic cement such as portland, natural, gypsum, or aluminous cement with the usual aggregates such as gravel, sand, marble chips, etc. Sand and portland cement are the preferred principal ingredients.

The cementitious mixture can be modified with a binary, ternary or quaternary latex of copolymers, such as styrene/butadiene, vinylidene chloride/vinyl chloride/ethyl acrylate, vinylidene chloride/vinyl chloride/2-ethyl hexyl acrylate, vinylidene chloride/acrylonitrile and vinylidene chloride/vinyl chloride/ethyl acrylate/acrylonitrile. In general, the foregoing latexes are added to the cement mixture in an amount ranging from about 5 to 45 percent by weight based on the cement used. A preferred latex is the binary copolymer latex consisting of 67 weight percent styrene and 33 weight percent butadiene. These latexes are well known in the art as is seen from U.S. Pat. 3,228,907.

The water vapor barrier characteristics of the laminates of this invention are substantially the same as those of a sulfonated film barrier since the cementitious laminations are porous and do not retard the transmission of water vapor. Likewise, the sulfonated film has substantially the same water vapor transmission rate as the unsulfonated film. For example, a sulfonated one mil sample of polyethylene has an average water vapor transmission rate of 0.100 perm and an untreated sample has a rate within plus or minus ten percent of that rate.

The following examples are presented solely to illustrate the invention and are not to be construed as a limitation of the scope of the claims.

EXAMPLES 1–7

Several laminates are prepared by taking blocks of commercial flame retardant extruded polystyrene foam, having dimensions of 3 inches square and 2 inches thick, and gluing them to a corresponding ½ inch thick plywood block with a commercial epoxy resin and curing. After the curing, screw eyes are screwed into one of the plywood faces of each block.

Each exposed 3" x 3" face of the foam is then coated with a latex modified cement prepared from 300 parts by weight of dry sand; 100 parts by weight of portland cement; 42.3 parts by weight of a styrene/butadiene copolymer latex consisting of 48 percent by weight of a copolymer of 67 percent by weight of styrene and 33 percent by weight of butadiene and 52 percent water; and 41 grams of water.

Matching pieces of sulfonated or unsulfonated polyethylene films are placed on each one of the foam faces after it is coated with a ⅛ inch layer of the above cement and another cement coated foam laminate is gently pressed on top of it to form several laminates of the type: wood/foam/cement/film/cement/foam/wood wherein the film is a sheet of polyethylene sulfonated on both sides.

After curing for 7 days at room temperature, the laminates are tested for tensile bond strength in an Instron tensile testing machine with the results given in Table I.

TABLE I

| Film | Separation at—p..s.i. | Notes |
|---|---|---|
| Control: | | |
| 1............ 4 mil polyethylene (P.E.)... | [1] 13.9 | Untreated film. |
| 2....................do...................... | [1] 6.12 | Do. |
| 3....................do...................... | [1] 8.34 | Do. |
| Average.................................... | 9.45 | |
| Example: | | |
| 1............ 4 mil sulfonated P.E......... | [2] 32.8 | Sulfonated on both sides for 2 minutes in a 3% solution of SO₃ in methylene chloride, neutralized in 2% aqueous ammonia, washed and dried. |
| 2....................do...................... | [3] 33.3 | Do. |
| 3....................do...................... | [4] 35.6 | Do. |
| 4............ 6 mil sulfonated P.E......... | [5] 32.6 | Do. |
| 5....................do...................... | [2] 39.5 | Do. |
| 6............ 8 mil sulfonated black P.E. (contains about 5% by weight carbon black). | [2] 35.6 | Do. |
| 7....................do...................... | [3] 31.9 | Do. |
| Average.................................... | 34.47 | |

[1] Between cement and film.
[2] Foam fractured.
[3] Screw eye pulled out from plywood.
[4] Between foam and cement.
[5] Failure of screw eye.

The foregoing table shows that the average value of the bond strength of the unsulfonated polyethylene film to the cement was about 9.5 p.s.i. whereas the sulfonated samples had bond strengths in excess of 30 p.s.i. and averaged about 34.5 p.s.i.

EXAMPLES 8–16

Several cementitious laminates are prepared by filling aluminum test rings (2¾" O.D.; 2" I.D.; and ⅝" thick) with a mortar of the type set forth below. Pieces of sulfonated or unsulfonated polyethylene film 6 mils thick are then placed on each. A second test ring is placed on top of the first and filled with the same mortar.

After curing the laminates for seven and fourteen days at room temperature, they are placed in a clamping fixture and the upper ring is pulled from the fixed lower ring in a tensile testing machine. The results are recorded in Table II, III and IV.

TABLE II

| Cement type | 7 day test (p.s.i.) | 14 day test (p.s.i.) | Film |
|---|---|---|---|
| Control: | | | |
| 1 — Latex modified portland cement | (¹) | 0.4 | 6 mil polyethylene. |
| 2 — do | 0.3 | 0.7 | Do. |
| 3 — do | 0.2 | 0.6 | Do. |
| 4 — do | 0.4 | 0.5 | Do. |
| 5 — do | (¹) | 1.4 | Do. |
| Average | 0.3 | 0.7 | |
| Example: | | | |
| 8 — Latex modified portland cement | 6.4 | 40.0 | 6 mil P.E. sulfonated and neutralized. |
| 9 — do | 2.6 | 3.9 | Do. |
| 10 — do | 16.4 | 57.5 | Do. |
| Average | 8.5 | 33.8 | |

¹ Pulled loose before testing.

TABLE III

| Cement type | 7 day test (p.s.i.) | 14 day test (p.s.i.) | Film |
|---|---|---|---|
| Control: | | | |
| 1 — Unmodified portland | 2.3 | 2.5 | 6 mil P.E. |
| 2 — do | 3.2 | 0.3 | Do. |
| 3 — do | 3.5 | 1.7 | Do. |
| 4 — do | 1.3 | 2.9 | Do. |
| 5 — do | 3.1 | 2.3 | Do. |
| Average | 2.7 | 1.9 | |
| Example: | | | |
| 11 — Unmodified portland | 15.9 | 10.6 | 6 mil P.E. sulfonated and neutralized. |
| 12 — do | 15.9 | 12.4 | Do. |
| 13 — do | 11.7 | 9.6 | Do. |
| Average | 14.5 | 10.9 | |

TABLE IV

| Cement type | 7 day test (p.s.i.) | 14 day test (p.s.i.) | Film |
|---|---|---|---|
| Control: | | | |
| 1 — Gypsum | 3.1 | (¹) | 6 mil P.E. |
| 2 — do | 3.5 | 0.1 | Do. |
| 3 — do | 3.8 | 0.1 | Do. |
| 4 — do | 1.0 | 0.1 | Do. |
| 5 — do | 3.2 | 0.1 | Do. |
| Average | 2.9 | 0.1 | |
| Example: | | | |
| 14 — Gypsum | 10.3 | 31.8 | 6 mil P.E. sulfonated and neutralized. |
| 15 — do | 7.3 | 21.0 | Do. |
| 16 — do | 4.3 | 28.3 | Do. |
| Average | 7.3 | 27.0 | |

¹ Pulled loose before testing.

In these examples, the mortars were made of three types latex-modified portland cement, unmodified portland cement, and gypsum cement. The first mortar is prepared as set forth in Examples 1–7. The second mortar is prepared in a similar manner using 1050 parts by weight of dry sand, 350 parts by weight of portland cement, 87.6 parts by weight of lime and 250 parts by weight of water. The third mortar is prepared in a similar manner using 1250 parts by weight of dry sand, 500 parts by weight of gypsum plaster and 350 parts by weight of water.

The sulfonated and neutralized polyethylene films are prepared by sulfonating the film on both sides in an atmosphere of two percent sulfur trioxide diluted with carbon dioxide for five minutes at 23° C. followed by dipping into a two percent aqueous ammonia solution, water washing and drying.

EXAMPLE 17

The tests set forth in Examples 8–16 are repeated using 5 mil oriented polystyrene film which has been sulfonated on both sides in an atmosphere of one percent sulfur trioxide in carbon dioxide for one minute at 23° C. and water washed and dried. Similar improved adhesion is obtained.

Similar improved results are obtained when using films of the other polymers, copolymers and blends thereof set forth above.

We claim:

1. A laminate comprising a sulfonated water insoluble resinous film and a layer of hydraulic cementitious material adhering to at least one surface of said film.

2. The laminate of claim 1 in which a second layer of cementitious material adheres to the other side of the film.

3. The laminate of claim 1 in which the sulfonated resinous film is a polymer made from the group consisting of (a) homopolymers of olefins,
(b) homopolymers of haloolefins,
(c) chlorinated polyolefins,
(d) homopolymers of vinyl esters,
(e) homopolymers of acrylic and methacrylic acid esters, (f) homopolymers of acrylonitrile,
(g) interpolymers of the monomers set forth in (a), (b), (d), (e), (f), and
(h) blends of the polymers set forth in (a), (b), (c), (d), (e), (f), (g).

4. The laminate of claim 1 in which the resinous film is surface sulfonated so that it contains a plurality of sulfonic acid groups.

5. The laminate of claim 1 in which the cementitious material is a latex modified portland cement.

6. The laminate of claim 3 in which the film is sulfonated to a degree that it contains from about 0.001 to about 50 milligram sulfur trioxide equivalents per square centimeter of treated surface.

7. The laminate of claim 3 in which the resinous film is surface sulfonated and neutralized so that it contains a plurality of sulfonic acid salt groups.

8. The laminate of claim 2, comprising, in addition, a base material bonded to said cementitious material and a layer of foamed plastic bonded to said second layer of cementitious material.

9. The laminate of claim 1 in which the hydraulic cementitious material is a gypsum cement.

10. The laminate of claim 9 comprising, in addition, a second sulfonated resinous film bonded to the other side of said gypsum cement.

11. The laminate of claim 9 in which the sulfonated resinous film is polyethylene.

12. The laminate of claim 10 in which the sulfonated resinous films are polyethylene.

References Cited

UNITED STATES PATENTS

| | | | |
|---|---|---|---|
| 2,400,720 | 5/1946 | Standinger et al. | 260—79.3 |
| 2,760,885 | 8/1956 | Larsen et al. | 117—122S |
| 2,832,697 | 4/1958 | Walles | 117—62.1X |
| 2,861,525 | 11/1958 | Curtis et al. | 52—408X |
| 2,901,377 | 8/1959 | Moers | 117—73X |
| 2,937,066 | 5/1960 | Walles | 117—138.82 |
| 2,956,915 | 10/1960 | Korn et al. | 161—256X |
| 3,079,730 | 5/1963 | Donegan | 52—408X |
| 3,228,907 | 1/1966 | Eash | 260—29.7 |
| 3,399,091 | 8/1968 | Cornay et al. | 161—256X |
| 3,438,163 | 4/1969 | Vevoda | 52—408X |

JOHN T. GOOLKASIAN, Primary Examiner

C. B. COSBY, Assistant Examiner

U.S. Cl. X.R.

52—408; 161—247, 256; 260—79.3